US012688347B2

(12) United States Patent
Cui et al.

(10) Patent No.: US 12,688,347 B2
(45) Date of Patent: Jul. 21, 2026

(54) SPECTRAL CHIP STRUCTURE DESIGN METHOD AND DEVICE FOR APPLICATION-SPECIFIC SPECTRAL LIBRARY

(71) Applicants: TSINGHUA UNIVERSITY, Beijing (CN); BEIJING SEETRUM TECHNOLOGY CO., LTD., Beijing (CN)

(72) Inventors: Kaiyu Cui, Beijing (CN); Hongbo Zhu, Beijing (CN); Yidong Huang, Beijing (CN); Wei Zhang, Beijing (CN); Xue Feng, Beijing (CN); Fang Liu, Beijing (CN)

(73) Assignees: TSINGHUA UNIVERSITY, Beijing (CN); BEIJING SEETRUM TECHNOLOGY CO., LTD., Beijing (CN)

( * ) Notice: Subject to any disclaimer, the term of this patent is extended or adjusted under 35 U.S.C. 154(b) by 829 days.

(21) Appl. No.: 18/079,706

(22) Filed: Dec. 12, 2022

(65) Prior Publication Data

US 2023/0409792 A1    Dec. 21, 2023

(30) Foreign Application Priority Data

Jun. 21, 2022    (CN) .......................... 202210709226.3

(51) Int. Cl.
*G06F 30/337*    (2020.01)
*G06F 111/20*    (2020.01)

(52) U.S. Cl.
CPC ........ *G06F 30/337* (2020.01); *G06F 2111/20* (2020.01)

(58) Field of Classification Search
CPC .. G06F 30/337; G06F 2111/20; G01J 3/0205; G01J 3/28; G01N 21/01; G01N 21/31; G01N 2021/0112
See application file for complete search history.

(56) References Cited

U.S. PATENT DOCUMENTS

| | | | |
|---|---|---|---|
| 10,145,894 B1 * | 12/2018 | Tangyunyong .. | G01R 31/31718 |
| 10,255,385 B2 * | 4/2019 | Pandev ................... | G06F 30/20 |
| 11,175,589 B2 * | 11/2021 | Lee ..................... | G03F 7/70625 |
| 12,455,995 B2 * | 10/2025 | Ko ......................... | G06F 30/331 |

(Continued)

*Primary Examiner* — Nha T Nguyen
(74) *Attorney, Agent, or Firm* — Sheppard Mullin Richter & Hampton LLP

(57)    ABSTRACT

A spectral chip structure design method includes: obtaining an application-specific spectral library, and determining a spectral principal component based on the application-specific spectral library; performing non-negative processing on the spectral principal component to obtain a nonnegative spectral principal component; and determining transmission spectra of the spectral chip structure based on the non-negative spectral principal component. By summarizing spectral features of the application-specific spectral library through the spectral principal component, a quantitative evaluation for the spectral library is realized and then by designing the spectral chip structure on this basis, a targeted quantitative design on the application-specific spectral library can be realized and the accuracy of reconstructing spectra by the spectral chip can be improved.

19 Claims, 11 Drawing Sheets

Obtaining an application-specific spectral library, and determining a spectral principal component based on the application-specific spectral library ⟩110

Performing non-negative processing on the spectral principal component to obtain a non-negative spectral principal component ⟩120

Determining transmission spectra of the spectral chip structure based on the non-negative spectral principal component ⟩130

(56)          References Cited

U.S. PATENT DOCUMENTS

2003/0103150 A1*   6/2003   Catrysse ............... H10F 39/156
                                                         348/E9.01
2003/0225535 A1*   12/2003  Doddi .................... G01B 11/00
                                                         356/625
2008/0186482 A1*   8/2008   Den Boef .......... G03F 7/70625
                                                         73/150 R
2012/0226644 A1*   9/2012   Jin ......................... G06N 3/045
                                                         706/19
2013/0173042 A1*   7/2013   Morisawa .......... G05B 19/4184
                                                         700/121
2013/0262044 A1*   10/2013  Pandev .................. G06F 30/20
                                                         703/1
2017/0186794 A1*   6/2017   Ockenfuss ............. G02B 5/285
2018/0107015 A1*   4/2018   Dümpelmann ........ G02B 5/008
2020/0158629 A1*   5/2020   Jang .................... G01N 21/255
2023/0200744 A1*   6/2023   Choi .................... A61B 5/7275
                                                         600/365
2024/0027269 A1*   1/2024   Cui ....................... G01J 3/2823
2024/0304645 A1*   9/2024   Zhang .................. G01J 3/0256

* cited by examiner

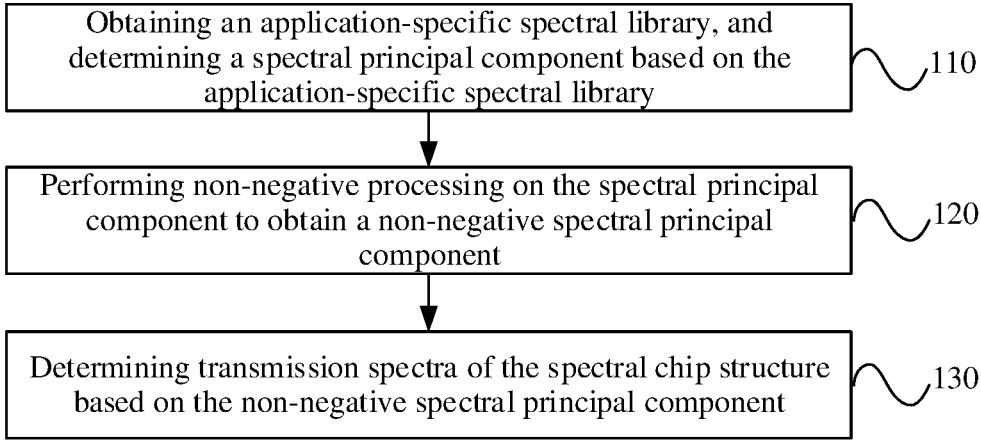

| Obtaining an application-specific spectral library, and determining a spectral principal component based on the application-specific spectral library | 110 |

| Performing non-negative processing on the spectral principal component to obtain a non-negative spectral principal component | 120 |

| Determining transmission spectra of the spectral chip structure based on the non-negative spectral principal component | 130 |

FIG. 1

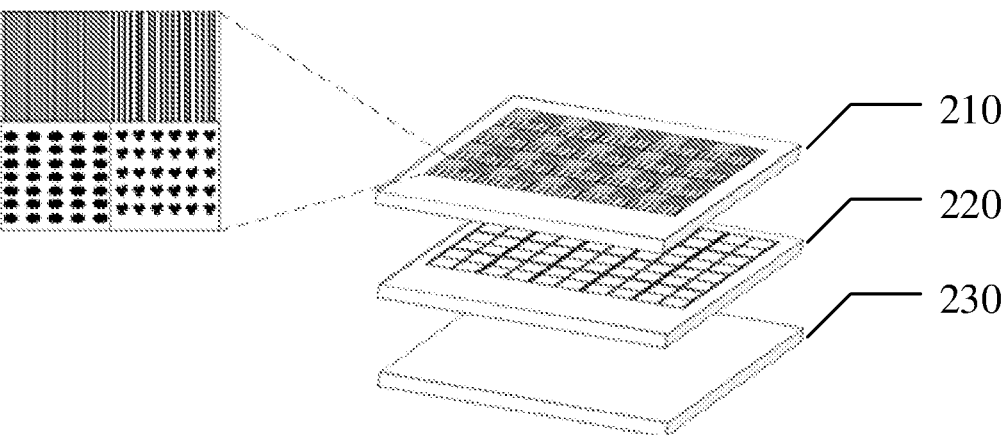

Relative
Intensity
(a.u.)

Wave (nm)

Relative
Intensity
(a.u.)

Wave (nm)

211     212

210-1
210-2
220
230

240-2

240

8/8

SPECTRAL CHIP STRUCTURE DESIGN METHOD AND DEVICE FOR APPLICATION-SPECIFIC SPECTRAL LIBRARY

CROSS-REFERENCE TO RELATED APPLICATION

The present application claims priority to Chinese Application No. 202210709226.3 filed on Jun. 21, 2022, entitled "Spectral Chip Structure Design Method and Device for Application-Specific Spectral Library", which is hereby incorporated by reference in entirety.

TECHNICAL FIELD

The present disclosure relates to the field of computer technology, in particular to a spectral chip structure design method and device for application-specific spectral library.

BACKGROUND

A spectral chip of a micro-spectrometer modulates incident light by using a micro-nano structure array, and then recovers spectral information of the incident spectra from a response of the spectral chip with the help of an algorithm. However, in the traditional structure design process, a spectral measurement recovery performance of a group of structures can only be roughly estimated by a complexity of transmission spectra of each micro-nano structure, which fails to perform the evaluation with a quantitative indicator, and then the micro-nano structure array of the spectral chip is designed based on that, resulting in low reconstruction accuracy of the designed spectral chip.

SUMMARY

The present disclosure provides a spectral chip structure design method for application-specific spectral library, which is used to solve the defect of low reconstruction accuracy of spectral chip designed in the related art, and to improve spectra reconstruction accuracy of the spectral chip. The present disclosure provides a spectral chip structure design method for application-specific spectral library, including:

obtaining an application-specific spectral library, and determining a spectral principal component based on the application-specific spectral library;

performing non-negative processing on the spectral principal component to obtain a non-negative spectral principal component; and determining transmission spectra of the spectral chip structure based on the non-negative spectral principal component.

In an embodiment, the determining the spectral principal component based on the application-specific spectral library includes:

performing zero-mean processing on the application-specific spectral library to obtain a preprocessed spectral library;

performing principal component analysis on the preprocessed spectral library to obtain at least one initial eigenvector and eigenvalue corresponding to each of the at least one initial eigenvector; and determining a principal component eigenvector based on the eigenvalue, where the principal component eigenvector is used to represent the spectral principal component.

In an embodiment, the performing principal component analysis on the preprocessed spectral library to obtain at least one initial eigenvector includes:

performing principal component analysis on the preprocessed spectral library based on preset principal component analysis conditions to obtain the at least one initial eigenvector, where the preset principal component analysis conditions are as follows:

$$\max_{A} tr\left(A^T \tilde{X} \tilde{X}^T A\right);$$

$$A^T A = I;$$

the obtaining of the at least one initial eigenvector includes:

obtaining $A=(a_1, a_2, \ldots, a_n)$, where tr represents a sum of all elements on a main diagonal, $\tilde{X}$ represents the preprocessed spectral library, $\tilde{X}^T$ represents a transpose of $\tilde{X}^\sim$, A represents an eigenmatrix, $A^T$ represents a transpose of the eigenmatrix, I represents a unitary matrix, and $a_n$ represents the initial eigenvector.

In an embodiment, the determining the principal component eigenvector based on the eigenvalue includes:

obtaining a corresponding contribution rate of each of the at least one initial eigenvector, where the corresponding contribution rate is a ratio of a corresponding eigenvalue of the initial eigenvector to a sum of all eigenvalues of the at least one initial eigenvector; and determining an initial eigenvector that satisfies a preset contribution rate threshold to be the principal component eigenvector.

In an embodiment, the method further includes:

optimizing the contribution rate threshold based on a preset accuracy requirement of spectral measurement and reconstruction.

In an embodiment, the determining the principal component eigenvector based on the eigenvalue includes:

sequencing the eigenvalue in descending order, and determining initial eigenvectors corresponding to first K eigenvalues to be principal component eigenvectors, where K is a preset positive integer.

In an embodiment, the method further includes:

optimizing the preset K based on a preset accuracy requirement of spectral measurement and reconstruction.

In an embodiment, the spectral chip includes at least one structural unit, and the method further includes:

performing quantity weighting based on the eigenvalue, and determining the quantity of a corresponding structural unit of each principal component eigenvector.

In an embodiment, the performing non-negative processing on the spectral principal component to obtain the non-negative spectral principal component includes:

obtaining an absolute value of the spectral principal component to obtain the non-negative spectral principal component; or adding a preset complementary value to the spectral principal component to obtain the non-negative spectral principal component.

In an embodiment, the determining the transmission spectra of the spectral chip structure based on the non-negative spectral principal component includes:

designing the transmission spectra of the spectral chip structure according to the non-negative spectral principal component; or selecting the transmission spectra of the spectral chip structure from pre-obtained candidate transmission spectra according to the non-negative spectral principal component.

In an embodiment, the method further includes:

performing similarity evaluation on the non-negative spectral principal component and the transmission spectra of the spectral chip structure, and optimizing the transmission spectra of the spectral chip structure based on a similarity evaluation result.

In an embodiment, a similarity evaluation method includes any one of the followings: likelihood calculation, correlation calculation, point-by-point difference, and root mean square error calculation.

In an embodiment, the method further includes: updating the application-specific spectral library.

The present disclosure further provides a spectral chip structure design device for application-specific spectral library, including:

an obtaining unit, configured to obtain an application-specific spectral library and determine a spectral principal component based on the application-specific spectral library;

a processing unit, configured to perform non-negative processing on the spectral principal component to obtain a non-negative spectral principal component; and a determining unit, configured to determine transmission spectra of the spectral chip structure based on the non-negative spectral principal component.

The present disclosure further provides an electronic equipment, including a processor and a memory storing a computer program that is executable by the processor, where the computer program, when executed by the processor, causes the processor to perform the steps of the spectral chip structure design method for application-specific spectral library described above.

The present disclosure further provides a non-transitory computer-readable storage medium having a computer program stored thereon, where the computer program, when executed by a processor, causes the processor to perform the steps of the spectral chip structure design method for application-specific spectral library described above.

The present disclosure further provides a computer program product including a computer program, where the computer program, when executed by a processor, causes the processor to perform the steps of the spectral chip structure design method for application-specific spectral library described above.

In the spectral chip structure design method and device for application-specific spectral library provided by embodiments of the present disclosure, by summarizing spectral features of the application-specific spectral library through the spectral principal component, the dimension of the data space of the studied spectral library can be reduced to facilitate the analysis of spectral library features, where the spectral principal component can retain the features that contribute the most to the spectral library, and the effective representation of the spectral library can be realized. In the embodiments of the present disclosure, by analyzing the spectral principal components, a quantitative evaluation for the spectral library can be realized, and then by designing the spectral chip structure on this basis, a targeted quantitative design on the application-specific spectral library can be realized and the accuracy of reconstructing spectra by the spectral chip can be improved.

BRIEF DESCRIPTION OF THE DRAWINGS

In order to more clearly illustrate the solutions according to the present disclosure or the related art, the accompanying drawings used in the description of the embodiments of the present disclosure or the related art will be briefly introduced below. It should be noted that the drawings in the following description are only part embodiments of the present disclosure. For those of ordinary skill in the art, other drawings can also be obtained according to these drawings without creative efforts.

FIG. 1 is a first of schematic flow diagrams of a spectral chip structure design method for application-specific spectral library provided by an embodiment of the present disclosure.

FIG. 2 is a first of structural schematic diagrams of a spectral chip provided by an embodiment of the present disclosure.

DETAILED DESCRIPTION

Figure 3:
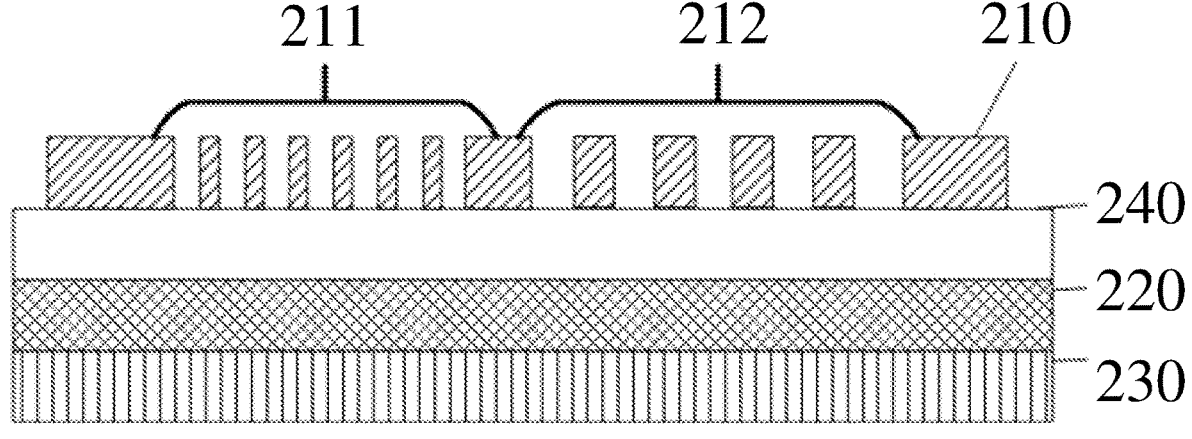
FIG. 3 is a structural schematic diagram of respective vertical layers of a spectral chip provided by an embodiment of the present disclosure.

In order to make the objectives, solutions and advantages of the present disclosure clearer, the solutions in the present disclosure will be clearly and completely described below with reference to the accompanying drawings. The described embodiments are part of the embodiments of the present disclosure, not all the embodiments. Based on the embodiments of the present disclosure, all other embodiments obtained by those of ordinary skill in the art without creative efforts shall fall within the protection scope of the present disclosure.

The spectral chip structure design method for application-specific spectral library provided by embodiments of the present disclosure will be described in the following with reference to FIG. 1 to FIG. 19.

FIG. 1 is a first of schematic flow diagrams of a spectral chip structure design method for application-specific spectral library provided by an embodiment of the present disclosure. As shown in FIG. 1, the spectral chip structure design method for application-specific spectral library includes the following steps.

Step 110: obtaining an application-specific spectral library, and determining a spectral principal component based on the application-specific spectral library.

An application-specific spectral library refers to spectral data containing multiple samples to be tested. Spectral data can be spectral information of the sample to be tested under a specific application, such as reflection, transmission or fluorescence of the sample, which carries the component features of the sample. The number of wavelength sampling points of each spectrum is n. The application-specific spectral library can be obtained by querying relevant sample information, actual testing, or numerical simulation calculation. It should be noted that the application-specific spectral library can be designed according to requirements, and then a more applicable spectral chip structure can be designed based on the application-specific spectral library.

A spectral principal component can be one or more vectors, which are able to summarize data distribution of higher dimension of an application-specific spectral library in lower dimension. For example, for n wavelength sampling points, that is, n-dimensional data, n vectors are required to represent its data distribution. After performing spectral principal component analysis, m (min) spectral principal components (namely m-dimensional data) can retain the main features of data distribution of the corresponding spectral library.

Step 120: performing non-negative processing on the spectral principal component to obtain a non-negative spectral principal component.

The performing non-negative processing on the spectral principal component includes processing the numerical values of the spectral principal component as non-negative values under the condition that the meanings (such as a relative size, etc.) represented by the spectral principal components remain unchanged.

Step 130: determining transmission spectra of the spectral chip structure based on the non-negative spectral principal component.

In an embodiment, FIG. 2 is a first of structural schematic diagrams of a spectral chip provided by an embodiment of the present disclosure. As shown in FIG. 2, the spectral chip provided by the embodiment of the present disclosure includes a modulation layer 210 and an image sensor 220. The modulation layer 210 has micro-nano structure arrays which have different modulation roles on incident light at different wavelength bands. The image sensor 220 can capture image information of visible light and near-infrared light, for example, the image sensor 220 can receive the signal of the incident light modulated by the modulation layer 210. The image sensor 220 can be complementary metal oxide semiconductor (CMOS) or charge-coupled device (CCD) or the like.

In an embodiment of the present disclosure, the modulation layer 210 is provided on an upper surface of the photosensitive area of the image sensor 220, and the modulation layer 210 is composed of a plurality of structural units, and each structural unit corresponds to one or more pixel points on the image sensor 220. The structural unit is composed of at least one group of micro-nano structure arrays, and the micro-nano structure array is implemented as a one-dimensional or two-dimensional periodic structure (micro-nano structure), and the micro-nano structure array of each structural unit is used to modulate the incident light and encode the spectral information of the incident light on the pixel points of the image sensor 220 to obtain a spectral signal including the spectral information of the incident light. In an embodiment, the measurement process can be as follows: the incident light is incident above the chip, passes through the light modulation layer 210, and is modulated within broad spectra by the micro-nano structure arrays of respective structural units. The modulated optical signal intensity is detected and then converted into an electrical signal by the image sensor 220. In an embodiment, the spectral chip can further include a signal processing circuit 230.

In an embodiment, FIG. 3 is a structural schematic diagram of respective vertical layers of a spectral chip provided by an embodiment of the present disclosure. FIG. 3 can correspond to the structure shown in FIG. 2, for example, the spectral chip provided by the embodiment of the present disclosure can include modulation layer 210 and image sensor 220. In an embodiment, the spectral chip provided by the embodiment of the present disclosure can further include a signal processing circuit 230 and/or a light-transmitting transition layer 240. The reference numerals 211 and 212 correspond to different structural units in the modulation layer 210, and different structural units are generally composed of different micro-nano structure arrays. The light-transmitting transition layer 240 can be a flat structure, which is beneficial to the formation of the modulation layer.

In an embodiment, transmission spectra of a structural unit can be the transmissivities of respective wavelengths when the light being incident from above and finally reaches the image sensor 220 after passing through the structural unit. In an embodiment, the determining the transmission spectra of the spectral chip structure based on the non-negative spectral principal component includes determining overall transmission spectra of the modulation layer 210 of the spectral chip based on the non-negative spectral principal component. As mentioned above, the modulation layer 210 includes a unit array composed of a plurality of structural units, and each of the structural units is composed of at least one group of micro-nano structure arrays, and then different transmissivities of incident light can be realized by providing different micro-nano structure arrays, and therefore the spectral signals received by the image sensor are also different, so that the spectral information can be reconstructed. For example, it can be determined that the application-specific spectral library has obvious wave peaks in the wavelength section a, the wavelength section b, and the wavelength section c according to the non-negative spectral principal component, and then the modulation layer 210 can be designed to have higher transmissivity in the wavelength section a, the wavelength section b, and the wavelength section c compared to other wavelength sections.

In the spectral chip structure design method for application-specific spectral library provided by embodiments of the present disclosure, by summarizing spectral features of the application-specific spectral library through the spectral principal component, the dimension of the data space of the studied spectral library can be reduced to facilitate the analysis of spectral library features, where the spectral principal component can retain the features that contribute the most to the spectral library, and the effective representation of the spectral library can be realized. In the embodiments of the present disclosure, by analyzing the spectral principal components, a quantitative evaluation on the spectral library can be realized, and then by designing the spectral chip structure on this basis, a targeted quantitative design on the application-specific spectral library can be realized and the accuracy of reconstructing spectra by the spectral chip can be improved.

Exemplary implementation manners of the above steps in specific embodiments will be further described in the following.

Step 110: obtaining an application-specific spectral library, and determining a spectral principal component based on the application-specific spectral library.

In an embodiment, the determining the spectral principal component based on the application-specific spectral library includes the following steps.

Step 111: performing zero-mean processing on the application-specific spectral library to obtain a preprocessed spectral library.

In an embodiment, zero-mean processing refers to that for a set of data, each of the set of data subtracts a mean value of this set of data. In an embodiment, after obtaining a mean spectrum of spectrum samples (spectral information) corresponding to the samples to be tested in the application-specific spectral library, each spectrum sample subtracts the mean spectrum to obtain a preprocessed spectral library $\tilde{X}$.

Step 112: performing principal component analysis on the preprocessed spectral library to obtain at least one initial eigenvector and eigenvalue corresponding to each of the at least one initial eigenvector.

In an embodiment, the initial eigenvector refers to the eigenvector obtained by performing principal component analysis and without being screened.

In an embodiment, the performing principal component analysis on the preprocessed spectral library to obtain at least one initial eigenvector includes:

performing principal component analysis on the preprocessed spectral library based on preset principal component analysis conditions to obtain the at least one initial eigenvector, where the preset principal component analysis conditions are as follows:

$$\max_{A} tr\left(A^T \tilde{X}\tilde{X}^T A\right);$$
$$A^T A = I;$$

the obtaining of at least one initial eigenvector includes:
obtaining A=($a_1$, $a_2$, . . . , $a_n$),
that is, to find the solution A meeting the condition that tr ($A^T\tilde{X}\tilde{X}^T$ A) is the maximum and $A^T$ A=I, where the columns of A are the eigenvectors of $\tilde{X}\tilde{X}^T$;
where tr represents a sum of all elements on a main diagonal, $\tilde{X}$ represents the preprocessed spectral library, $\tilde{X}^T$ represents a transpose of $\tilde{X}^-$, A represents an eigenmatrix, $A^T$ represents a transpose of the eigenmatrix, I represents a unitary matrix, and $a_n$ represents the initial eigenvector.

It should be noted that those skilled in the art can calculate the eigenvalue based on the initial eigenvector according to the related art, and the calculation method of the eigenvalue will not be repeated here.

Step 113: determining a principal component eigenvector based on the eigenvalue, where the principal component eigenvector is used to represent the spectral principal component.

In an embodiment, an eigenvalue can reflect features of an initial eigenvector. By screening the eigenvalues (such as numerical comparing, etc.), the eigenvector having greater effect on the spectral library (such as has larger proportion or higher contribution rate) can be determined among the initial eigenvectors, and then the eigenvector with greater effect can be taken as a principal component eigenvector.

In an embodiment, the determining the principal component eigenvector based on the eigenvalue includes the following steps.

Step 1131: obtaining a corresponding contribution rate of each of the at least one initial eigenvector, where the corresponding contribution rate is a ratio of a corresponding eigenvalue of the initial eigenvector to a sum of all the eigenvalues of the at least one initial eigenvector.

For example, the eigenvalue corresponding to the initial eigenvector $a_1$ is 1, the eigenvalue corresponding to the initial eigenvector $a_2$ is 2, and the eigenvalue corresponding to the initial eigenvector $a_3$ is 3; and then the contribution rate corresponding to the initial eigenvector $a_1$ is $$\frac{1}{1+2+3} = \frac{1}{6},$$

the contribution rate corresponding to the initial eigenvector $a_2$ is $$\frac{2}{1+2+3} = \frac{1}{3},$$

and the contribution rate corresponding to the initial eigenvector $a_3$ is $$\frac{3}{1+2+3} = \frac{1}{2}.$$

Step 1132: determining an initial eigenvector that satisfies a preset contribution rate threshold to be the principal component eigenvector.

For example, if the preset contribution rate threshold is 30% and a satisfaction condition is not less than 30%, the initial eigenvectors satisfying the preset contribution rate threshold are the initial eigenvector $a_2$ and the initial eigenvector $a_3$. The initial eigenvector $a_2$ and the initial eigenvector $a_3$ are taken as the principal component eigenvectors.

It should be noted that the above are examples for illustrating the present disclosure, and should not constitute any limitation of the present disclosure. The preset contribution rate threshold and the satisfaction condition of the preset contribution rate threshold (including but not limited to greater than, less than, not greater than, or not less than the preset contribution rate threshold) can be set according to actual practice.

In an embodiment, the method further includes:

step 1133: optimizing the contribution rate threshold based on a preset accuracy requirement of spectral measurement and reconstruction.

In an embodiment, optimizing the contribution rate threshold can include increasing the contribution rate threshold. For example, after taking the initial eigenvector $a_2$ and the initial eigenvector $a_3$ as the principal component eigenvectors, assuming that the spectral similarity between the spectra obtained by performing reconstruction using the designed spectral chip and the spectra in the spectral library is 40% and the preset accuracy requirement of spectral measurement and reconstruction is 70%, since 40% is less than 70%, the spectra obtained by performing reconstruction using the designed spectral chip is not meet the preset accuracy requirement of spectral measurement and reconstruction, and then the preset contribution rate threshold can be increased from 30% to 60%. It should be noted that the above are examples for illustrating the present disclosure, and should not constitute any limitation of the present disclosure.

In an embodiment, the determining the principal component eigenvector based on the eigenvalue includes:

step 1134: sequencing the eigenvalue in descending order, and determining initial eigenvectors corresponding to first K eigenvalues to be principal component eigenvectors, where K is a preset positive integer.

In an embodiment, the eigenvalues are sequenced in descending order, K eigenvalues with larger value are selected according to requirements, and the eigenvectors corresponding to the K eigenvalues are the principal components. For example, the eigenvalues of the initial eigenvector $a_1$, the initial eigenvector $a_2$, and the initial eigenvector $a_3$ are sequenced in descending order, the two eigenvectors corresponding to the first two eigenvalues are selected, and then the initial eigenvector $a_2$ and the initial eigenvector $a_3$ are taken as the principal component eigenvectors.

In an embodiment, the method further includes:

step 1135: optimizing the preset K based on a preset accuracy requirement of spectral measurement and reconstruction.

In an embodiment, the optimizing the preset K can include decreasing the value of K. For example, after taking the initial eigenvector $a_2$ and the initial eigenvector $a_3$ as the principal component eigenvectors, assuming that the spectral similarity between the spectra obtained by performing reconstruction using the designed spectral chip and the spectra in the spectral library is 40% and the preset accuracy requirement of spectral measurement and reconstruction is 70%, since 40% is less than 70%, the spectra obtained by performing reconstruction using the designed spectral chip is not meet the preset accuracy requirement of spectral measurement and reconstruction, and then the value of K can be decreased from 2 to 1. It should be noted that the above are examples for illustrating the present disclosure, and should not constitute any limitation of the present disclosure.

In an embodiment, the spectral chip includes at least one structural unit, and the method further includes:

performing quantity weighting based on the eigenvalue, and determining the quantity of a corresponding structural unit of each principal component eigenvector.

In one embodiment, the weight is set to be 1, and the principal component eigenvector corresponds to the structural unit one-to-one, that is, all spectral principal components correspond to the transmission spectra of the structural unit one-to-one.

In an embodiment, different weights are assigned to the quantity of the structural units corresponding to each principal component eigenvector according to the contribution rate, for example, the spectral principal component with a larger contribution rate can correspond to a larger quantity of structural units. In an embodiment, the type of the structural unit can be determined according to the similarity. The illustration of the similarity can be referred to the description in step 130. According to the contribution rate from large to small, there are first principal component, second principal component, third principal component, . . . , $K^{th}$ principal component. The first principal component corresponds to the 6 structural units with the highest similarity, the second principal component corresponds to the 5 structural units with the highest similarity, the third principal component corresponds to the 4 structural units with the highest similarity, the fourth principal component corresponds to the 3 structural units with the highest similarity, the fifth principal component corresponds to the 2 structural units with the highest similarity, and all the remaining (K−5) principal components correspond to 1 structural unit, and the total quantity of structures should be less than the number of wavelength sampling points n. The above-mentioned quantity of structural units is for illustration only, and can be adjusted according to whether the spectral reconstruction effect satisfies a preset target.

Step 120: performing non-negative processing on the spectral principal component to obtain a non-negative spectral principal component.

In an embodiment, the performing non-negative processing on the spectral principal component to obtain the non-negative spectral principal component, includes:

obtaining an absolute value of the spectral principal component to obtain the non-negative spectral principal component; or adding a preset complementary value to the spectral principal component to obtain the non-negative spectral principal component.

In an embodiment, the performing non-negative processing on the spectral principal component includes, but is not limited to, directly obtaining the absolute value of the spectral principal component or adding a positive value to all spectral principal components. In an embodiment, all spectral principal components are added the mean spectrum of the spectral library.

Step 130: determining transmission spectra of the spectral chip structure based on the non-negative spectral principal component.

In an embodiment, the determining the transmission spectra of the spectral chip structure based on the non-negative spectral principal component includes:

step 131: designing the transmission spectra of the spectral chip structure according to the non-negative spectral principal component; or step 132: selecting the transmission spectra of the spectral chip structure from pre-obtained candidate transmission spectra according to the non-negative spectral principal component.

In an embodiment, with the non-negative spectral principal component as a reference, the structural transmission spectra (i.e., the transmission spectra of the spectral chip structure) is designed or the transmission spectra is selected from the transmission spectra of the existing structure. The higher the similarity between the structural transmission spectra and the spectral principal component, the better the structural design quality of the spectral chip, and the better the spectra measurement reconstruction effect. In an embodiment, better quality of the spectral chip structure design means that, for the units with the same quantity, better likelihood of spectral measurement reconstruction, higher accuracy of the central wavelength, better resolution and other indicators, or fewer quantity of structure units required to reach the same spectral measurement reconstruction effect. The structural transmission spectra here includes, but is not limited to, that obtained by means of numerical simulation or testing actual structures.

In an embodiment, the method further includes:

performing similarity evaluation on the non-negative spectral principal component and the transmission spectra of the spectral chip structure, and optimizing the transmission spectra of the spectral chip structure based on a similarity evaluation result.

In an embodiment, with the non-negative spectral principal component as a reference, the transmission spectra of the spectral chip structure is designed or the transmission spectra is selected from the transmission spectra of the existing structure. The transmission spectra of the spectral chip structure and the spectral principal component have high similarity, thereby improving the spectral measurement reconstruction effect. For example, there are 6 candidate transmission spectra of the spectral chip structure, and 2 candidate transmission spectra with the highest similarity can be selected to be the transmission spectra of the spectral chip structure according to the similarity between the transmission spectra and the non-negative spectral principal component; or if there is 1 candidate transmission spectra of the spectral chip structure and the similarity between the candidate transmission spectra and the non-negative spectral principal component is 60%, the similarity can be improved by optimizing the candidate transmission spectra of the spectral chip structure. For example, the candidate transmission spectra of the spectral chip structure can be optimized by one or more of the followings: optimizing the transmission spectra of the spectral chip structure by one or more of the followings: adjusting details of the spectral chip structure based on an inverse design theory; changing a period of the spectral chip structure; adjusting a position of absorption peak; and adjusting a material of the spectral chip structure to adjust refraction index.

It should be noted that the numbers in the embodiments of the present disclosure are examples for easy illustrating, and should not constitute any limitation to the embodiments of the present disclosure.

The similarity between the structural transmission spectra and the principal component can be measured by methods including but not limited to likelihood, correlation, point-by-point difference, root mean square error, and the like. In an embodiment, the relevant concepts are defined as follows. If the structural transmission spectra is $X \in R^{n \times 1}$ and the principal component is $Y \in R^{n \times 1}$, the likelihood is $F(X, Y) = (\Sigma_n \sqrt{X_i Y_i})^2$ (i=1, 2, . . . , n); and the correlation is $$R = \frac{\sum_n (X_i - \bar{X})(Y_i - \bar{Y})}{\sqrt{\sum_n (X_i - \bar{X})^2} \sqrt{\sum_n (Y_i - \bar{Y})^2}}.$$

In the spectral chip structure design method for application-specific spectral library provided by embodiments of the present disclosure, for the application-specific spectral library, on the basis of the spectral library of the sample with the existing application, the main features of the application spectra can be obtained by analysis, and by designing or screening broad spectra modulation features of the modulation layer based on the main features, high precision measurement of an incident light spectra can be realized and the accuracy of recovering the spectra can be effectively improved.

In an embodiment, the method further includes:

updating the application-specific spectral library.

In an embodiment of the present disclosure, obtaining features or spectra samples that are not included by the application-specific spectral library, adding them to the application-specific spectral library, and then repeating the structure design of the spectral chip to further analyze, optimize and enrich the structure design of the spectral chip.

Figure 4:
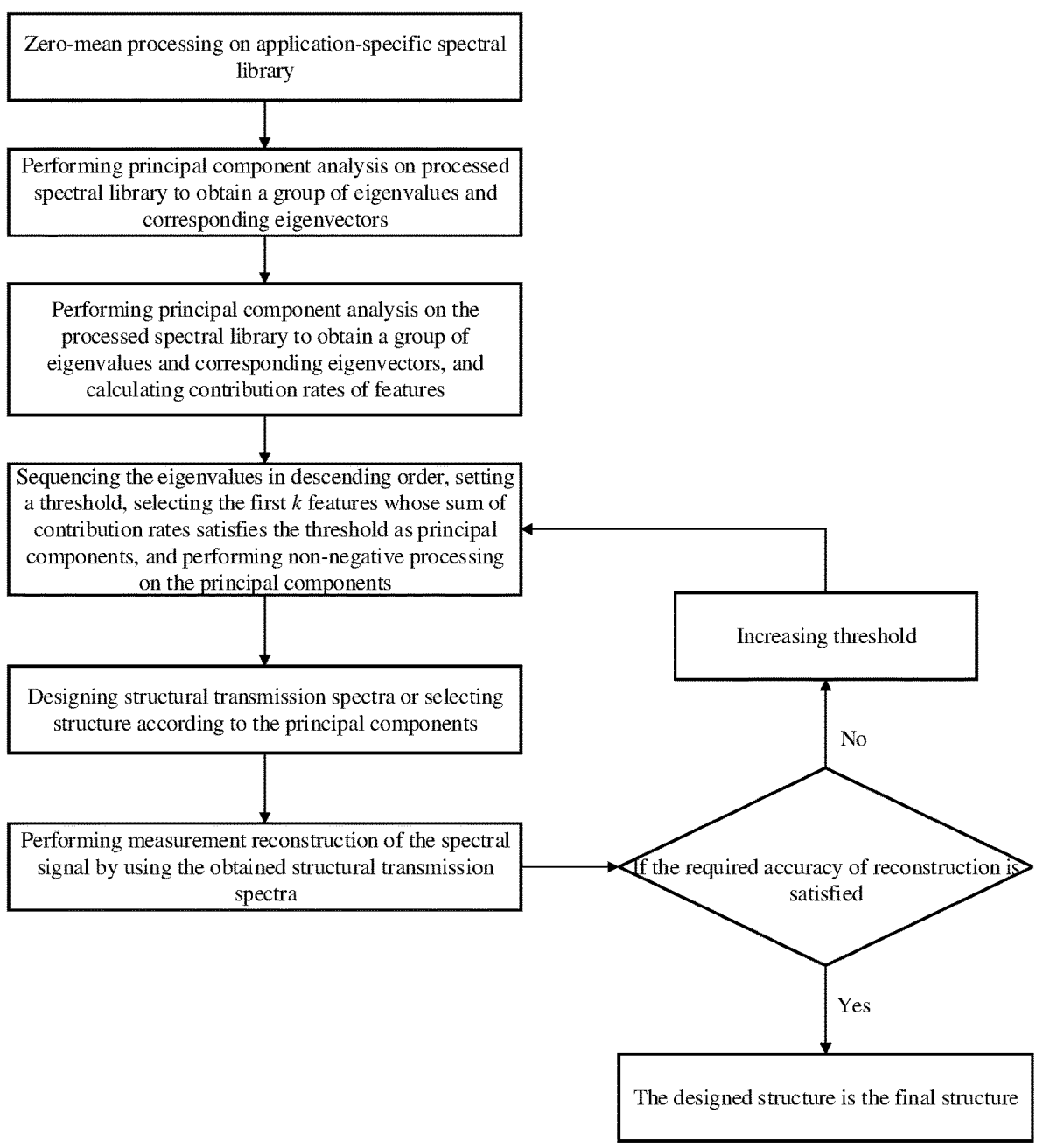
FIG. 4 is a second of schematic flow diagrams of the spectral chip structure design method for application-specific spectral library provided by the embodiment of the present disclosure.

FIG. 4 is a second of schematic flow diagrams of a spectral chip structure design method for application-specific spectral library provided by an embodiment of the present disclosure. As shown in FIG. 4, the spectral chip structure design method for application-specific spectral library provided by the embodiment of the present disclosure includes the following steps.

Step 1: obtaining a spectral principal component of an application-specific object (scenario), which includes the following steps.

1) A spectral library of the application-specific object is obtained. A spectral library can refer to spectral information of the sample to be tested under a specific application, such as reflection, transmission or fluorescence of the sample, which carries the component features of the sample. The number of wavelength sampling points of each spectrum is n. The spectral library can be obtained by querying relevant sample information, actual testing, or numerical simulation calculation.

2) Zero-mean processing is performed on the spectral library, for example, after obtaining a mean spectrum of all spectrum samples, each sample subtracts the mean spectrum to obtain a processed spectral library $\tilde{X}$.

3) Principal component analysis is performed based on the preprocessed spectral library, that is, to solve $$\max_A \; tr\!\left(A^T \bar{X}\bar{X}^T A\right),$$

where $A^T A = I$. After that, a set of eigenvalues and the corresponding eigenvectors (respective columns of A) are obtained.

For example, zero-mean processing is performed on the spectral library with a target application (application-specific spectral library), and principal component analysis is performed, and then a set of eigenvalues $\lambda=(\lambda_1, \lambda_2, \ldots, \lambda_n)^T$ and the corresponding eigenvectors $A=(a_1, a_2, \ldots, a_n)$ are obtained.

4) The eigenvalues are sequenced in descending order, the ratio of each eigenvalue to the sum of all the eigenvalues is defined as the contribution rate of the corresponding feature. A contribution rate threshold is set, and the first k features whose contribution rates satisfy the threshold are selected. The eigenvectors corresponding to the k eigenvalues are the principal components. In this step, k features with larger eigenvalues can also be directly selected according to requirements, and the corresponding eigenvectors are the principal components.

Step 2: performing non-negative processing on the spectral principal component, which includes, but is not limited to, directly obtaining the absolute value or adding a positive value to all spectral principal components. In an embodiment, all spectral principal components are added the mean spectrum of the spectral library.

Step 3: with the non-negative principal component as a reference, designing the transmission spectra of the spectral chip structure or selecting it according to the transmission spectra of the existing structure. The higher the similarity between the transmission spectra of the spectral chip structure and the spectral principal component, the better the structural design quality of the spectral chip, and the better the spectra measurement reconstruction effect. In an embodiment, better quality of the spectral chip structure design means that, for the units with the same quantity, better likelihood of spectral measurement reconstruction, higher accuracy of the central wavelength, better resolution and other indicators, or fewer quantity of the units required to reach the same spectral measurement reconstruction effect. The structural transmission spectra here includes, but is not limited to, that obtained by means of numerical simulation or testing actual structures. The similarity between the structural transmission spectra and the principal component can be measured by methods including but not limited to likelihood, correlation, point-by-point difference, root mean square error, and the like. In an embodiment, the relevant concepts are defined as follows. If the structural transmission spectra is $X \in R^{n\times 1}$ and the principal component is $Y \in R^{n\times 1}$, the likelihood is $F(X, Y)=(\Sigma_n \sqrt{X_i Y_i})^2$ (i=1, 2, ..., n); and the correlation is $$R = \frac{\sum_n (X_i - \bar{X})(Y_i - \bar{Y})}{\sqrt{\sum_n (X_i - \bar{X})^2}\,\sqrt{\sum_n (Y_i - \bar{Y})^2}}.$$

Step 4: in an embodiment, according to the similarity between the spectral principal components and the structural transmission spectra, the spectral principal components can correspond to the structural units one-to-one, or one spectral principal component can correspond to a plurality of structural units, to ensure that the features of spectral principal component has been sufficiently retained. In an embodiment, the spectral chip structure has a higher transmittance in the wavelength band corresponding to the spectral principal component.

Step 5: in an embodiment, according to the accuracy requirements for the measurement and reconstruction of the spectral chip structure, the aforementioned contribution rate threshold can be further optimized to adjust the selection of the eigenvalue.

Step 6: in an embodiment, for the spectral library mentioned above, in subsequent research or testing, if features or spectrum samples that were not included before are found, these can be added to the spectral library. The above steps can be repeated to further analyze, optimize and enrich the structure design of the spectral chip.

The spectral chip structure design method for application-specific spectral library provided by embodiments of the present disclosure will be illustrated in conjunction with the embodiments.

Embodiment 1

Zero-mean processing is performed on the spectral library of the target application and a principal component analysis is performed, and then a set of eigenvalues $\lambda=(\lambda_1, \lambda_2, \ldots, \lambda_n)^T$ and their corresponding eigenvectors $A=(a_1, a_2, \ldots, a_n)$ are obtained. Each eigenvector $a_i$ is a spectral principal component, namely a feature in the spectral library, whose contribution rate is $$\frac{\lambda_i}{\sum_i \lambda_i}.$$

The higher contribution rate of the feature, the more important the feature is to this spectral library and the higher the chance of occurrence of the feature. The contribution rates are sequenced in descending order, the contribution rate threshold $\Gamma$ is set, and the first k features are selected to make that $$\sum_1^{k-1} \frac{\lambda_i}{\sum_i \lambda_i} < \Gamma < \sum_1^{k} \frac{\lambda_i}{\sum_i \lambda_i}.$$

Figure 5:
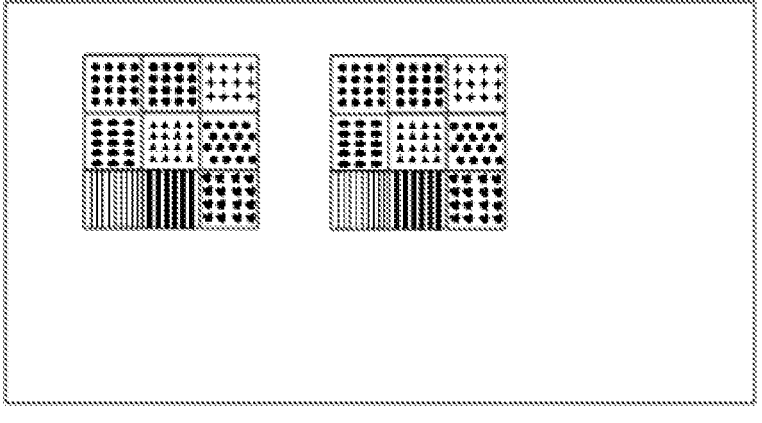
FIG. 5 is a schematic structural diagram of a modulation layer of a designed spectral chip provided by an embodiment of the present disclosure.
Figure 6:
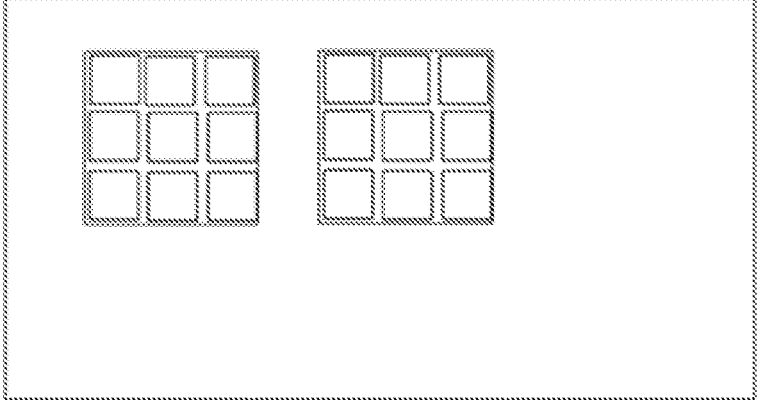
FIG. 6 is a schematic diagram of sensor arrangement corresponding to a modulation layer of a designed spectral chip provided by an embodiment of the present disclosure.
Figure 7:
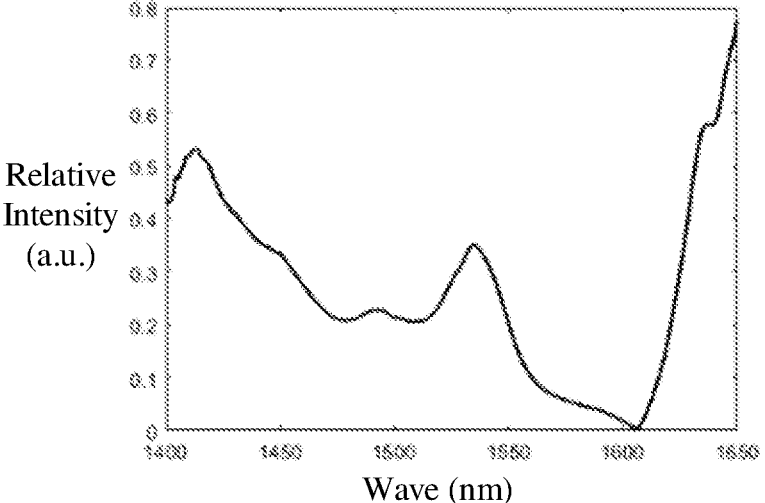
FIG. 7 is a schematic diagram of a first principal component provided by an embodiment of the present disclosure.

These eigenvectors are the spectral principal components, and then non-negative processing is performed on these spectral principal components. For example, the mean spectrum of the spectral library is added to these spectral principal components, and the absolute value of the smallest negative number among all the eigenvectors is further added to these spectral principal components. For each non-negative spectral principal component, the structural unit having transmission spectra which is the most similar with it is selected, for example, the correlation coefficient is the highest. In an embodiment, the structural unit of the modulation layer can be prepared based on a series of structural units selected by the method provided by the embodiments of the present disclosure, and then can be tested or performed numerical simulation to calculate the effect of measurement reconstruction restoration of the sample in the spectral library. If the effect meets the accuracy requirement, it will be the final structural unit; and if the effect does not meet the accuracy requirement, the threshold $\Gamma$ can be increased and the above process can be repeated. For example, if finally k=9, the first 9 features are taken to design the structural units corresponding to the transmission spectra to form a spectral pixel. A spectral pixel refers to a group of structural units used to achieve complete spectral measurement reconstruction functions, including at least two types of structural unit for modulating incident light. Referring to FIG. 5 and FIG. 6, FIG. 5 is a schematic structural diagram of a modulation layer of a designed spectral chip provided by an embodiment of the present disclosure, and FIG. 6 is a schematic diagram of sensors arrangement corresponding to a modulation layer of a designed spectral chip provided by an embodiment of the present disclosure.

Embodiment 2

Zero-mean processing is performed on the spectral library of the target application and a principal component analysis is performed, and finally a group of eigenvectors whose contribution rates meet the threshold $\Gamma$ are obtained and being non-negative. By using theory such as structural inverse design, this group of non-negative principal components is used as the transmission spectra to inversely design the micro-nano structure array of the modulation layer. For the transmission spectra that cannot be operated, the structural unit with the similar transmission spectra can be selected to replace it, or it can be divided into a parts and operated respectively, and corresponding a micro-nano structure arrays are designed, and then the a micro-nano structure arrays are constituted to a structural unit being added to the final designed micro-nano structure array.

Embodiment 3

Figure 8:
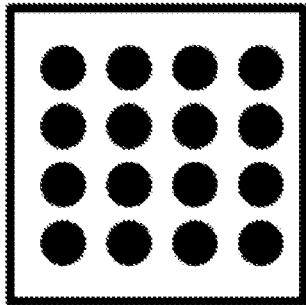
FIG. 8 is a schematic structural diagram of a structural unit I provided by an embodiment of the present disclosure.
Figure 9:
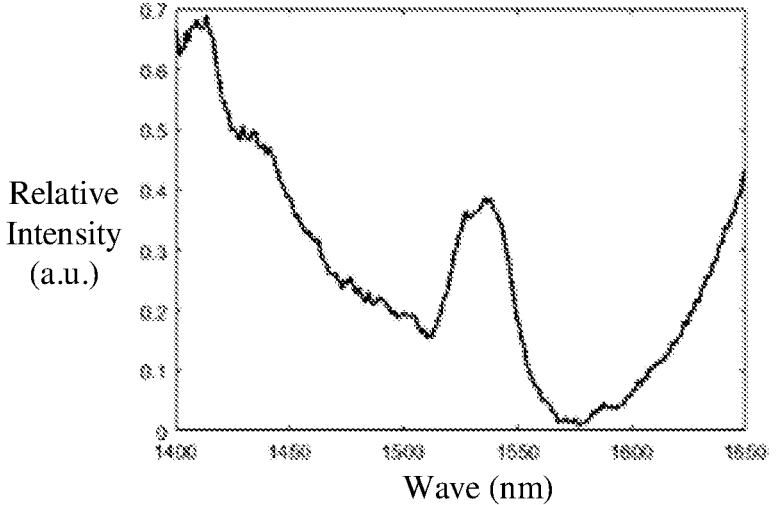
FIG. 9 is a schematic diagram of transmission spectra of the structural unit I provided by an embodiment of the present disclosure.
Figure 10:
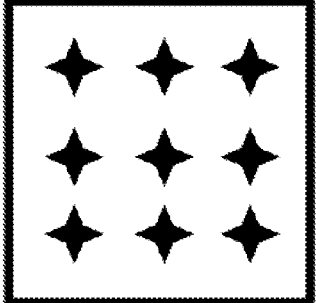
FIG. 10 is a schematic structural diagram of structural unit II provided by an embodiment of the present disclosure.
Figures 11, 12:
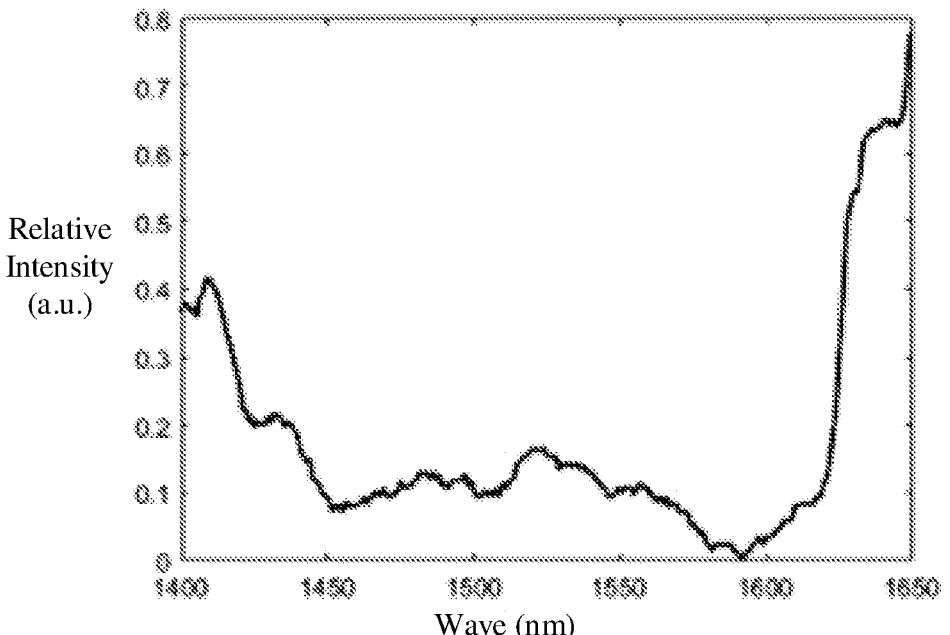
FIG. 11 is a schematic diagram of transmission spectra of the structural unit II provided by an embodiment of the present disclosure.
FIG. 12 is a first of structural schematic diagrams of a modulation layer of a spectral chip provided by an embodiment of the present disclosure.

Zero-mean processing is performed on the spectral library A of the target application and a principal component analysis is performed, and finally a group of eigenvectors whose contribution rates meet the threshold $\Gamma$ are obtained and being non-negative. The first p principal components are selected to be reserved and performed matching with structural transmission spectra. After calculating the likelihood of each structural transmission spectra and the first principal component, the two structures with the highest likelihood are: structural unit I and structural unit II. Referring to FIG. 7, FIG. 8, FIG. 9, FIG. 10 and FIG. 11, FIG. 7 is a schematic diagram of a first principal component provided by an embodiment of the present disclosure, FIG. 8 is a schematic structural diagram of a structural unit I provided by an embodiment of the present disclosure, FIG. 9 is a schematic diagram of transmission spectra of the structural unit I provided by an embodiment of the present disclosure, FIG. 10 is a schematic structural diagram of structural unit II provided by an embodiment of the present disclosure, and FIG. 11 is a schematic diagram of transmission spectra of the structural unit II provided by an embodiment of the present disclosure. The likelihood of the structural unit I and the first principal component is 0.965, and the likelihood of the structural unit II and the first principal component is 0.953. In an embodiment, the first principal component can be the one with the highest contribution rate in the spectral library.

The likelihoods of the two structural units and the first principal component are both high and have highlighted the features of different parts of the principal component, so these two structures are reserved for the first principal component. For each of the other principal components, a unit structure with the highest likelihood is reserved, and the final spectral pixel contains (p+1) structures.

In the spectral chip structure design method for application-specific spectral library provided by embodiments of the present disclosure, by performing feature extraction on the application-specific spectral library based on principal component analysis and designing the structural unit of the modulation layer of the spectral chip according to the main features of the target application spectra (or it can be described that designing the micro-nano structure array corresponding to the structural unit), the target of structural design is clarified, the spectral chip measurement recovery accuracy is improved, and the number of required structural units is reduced.

The spectral chip designed by the embodiments of the present disclosure will be further described below.

A structural transmission spectra (i.e. the transmission spectra of the spectral chip structure) refers to the transmissivities of respective wavelengths when the light being incident from above and passing through the structural unit. FIG. 12 is a first of structural schematic diagrams of a modulation layer of a spectral chip provided by an embodiment of the present disclosure. As shown in FIG. 3 and FIGS. 12, 211 and 212 are different structural units with different structural transmission spectra, whose structures may be one-dimensional gratings, two-dimensional periodic hole structure, etc. The shape of the hole can be a regular shape such as a circle, a polygon, an ellipse, a cross, etc., or an irregular shape, and the parameters such as the period and the duty ratio of the grating and the periodic hole structure can be adjusted. The lattice of the periodic hole structure can be square or other polygonal structures. In an embodiment, on the basis of the structural transmission spectra, the structural unit of the spectral chip can be designed and prepared according to the actual practice, to make the spectral chip is more suitable for the corresponding application-specific scenario.

The material of the modulation layer can be silicon, silicon compound, germanium, germanium compound, germanium-silicon material, group III-V material, and the like. Compared with metals and other materials, these materials have smaller light loss. In an embodiment, the characteristic of being insensitive to the polarization of incident light can be achieved by making the overall structural pattern being C4 symmetry, for example, it can be coincident after rotating 90°, 180°, or 270°.

Between the modulation layer 210 and the image sensor layer 220, there can be a layer of polymer such as PDMS, SU-8, or a layer of compounds such as silicon oxide and sapphire as the light-transmitting transition layer 240, which is convenient for realizing the functions such as filtering after being machined or processed. In an embodiment, as shown in FIG. 3, this layer is not essential.

The modulation layer can be composed of one layer structure or multiple layer structures (two layer structures or more layer structures). When multiple layer structures are stacked as the modulation layer, the final transmission spectra is jointly determined by the multiple layer structures. When the propagation optical path between two layer structural units is long, it can be regarded as the superposition (multiplication) of the transmission spectra of each layer. In the embodiments of the present disclosure, if the adjacent multiple layer structures are attached to each other, it needs to be regarded as an interaction of the multiple layer structures, which can be regarded as a whole, and a corresponding structural transmission spectra T is generated. The structural transmission spectra T is not simply superimposed by the structural transmission spectra of respective layers, but it is generated through the interaction of the respective layer structural units with each other. In an embodiment, in the solution of multiple layer structures, the corresponding structural units of respective layers can be different, for example, the transmission spectra can be different, the structures can be different, or the same structures can have different sizes, which is not limited here.

The advantages of this embodiment are described in combination with the solutions of the present disclosure. In the present disclosure, the principal components of the spectral library are obtained and the corresponding structural transmission spectra are designed according to the principal components. However, under certain circumstances, the required principal components need to be modulated by complex structural transmission spectra. The complexity of a structural transmission spectra is related to the complexity of the structure in a certain extent, that is, the complex structure can make the structural transmission spectra complex. However, the complex structure is difficult to be designed and more difficult to be processed, especially in that it is difficult to ensure accuracy. In this embodiment, the multiple layer structures (such as two layer structures) can be used to reduce the complexity of each layer structure, and a complex structural transmission spectra can be obtained by the modulation of the two layer structures cooperatively.

Figure 13:
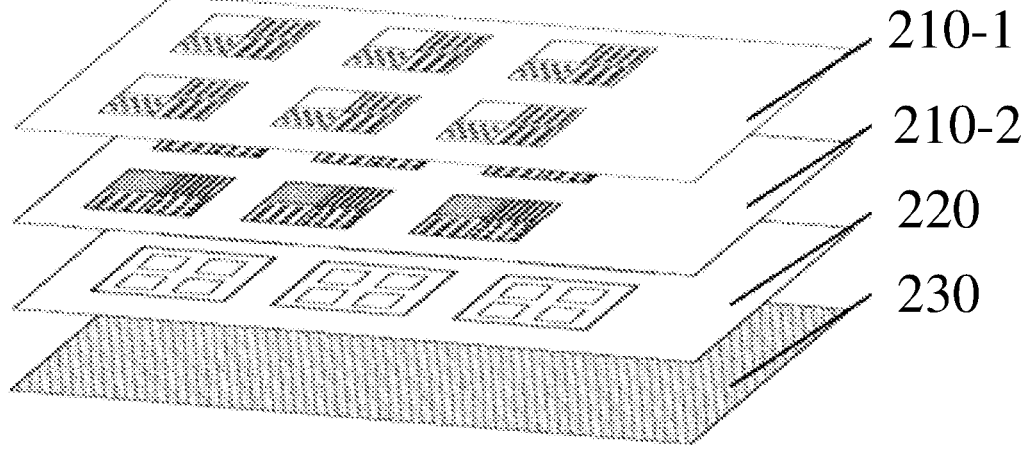
FIG. 13 is a schematic structural diagram of a spectral chip based on multi-layer of modulation layer provided by an embodiment of the present disclosure.

The present disclosure provides specific embodiments to introduce the multiple layer structures. FIG. 13 is a schematic structural diagram of a spectral chip based on multi-layer of modulation layer provided by an embodiment of the present disclosure. As shown in FIG. 13, two layers are used as an example for description. The structural transmission spectra of the first modulation layer 210-1 is different from the structural transmission spectra of the second modulation layer 210-2 in a corresponding area. In an embodiment, the corresponding area can be explained as: an incident light enters the modulation unit B of the second modulation layer after passing through the modulation unit A of the first modulation layer, and then be received by the sensing unit, where the modulation unit A of the first modulation layer and the modulation unit B of the second modulation layer can be called as corresponding areas.

Figure 14:
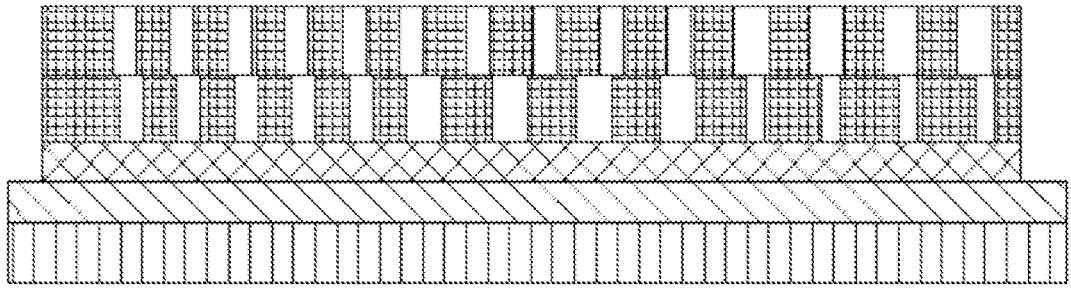
FIG. 14 is a second of structural schematic diagrams of the spectral chip provided by the embodiment of the present disclosure.

FIG. 14 is a second of structural schematic diagrams of the spectral chip provided by the embodiment of the present disclosure. As shown in FIG. 14, the structure of each layer can be divided, and the structural units of respective layers correspond to each other.

Figure 15:
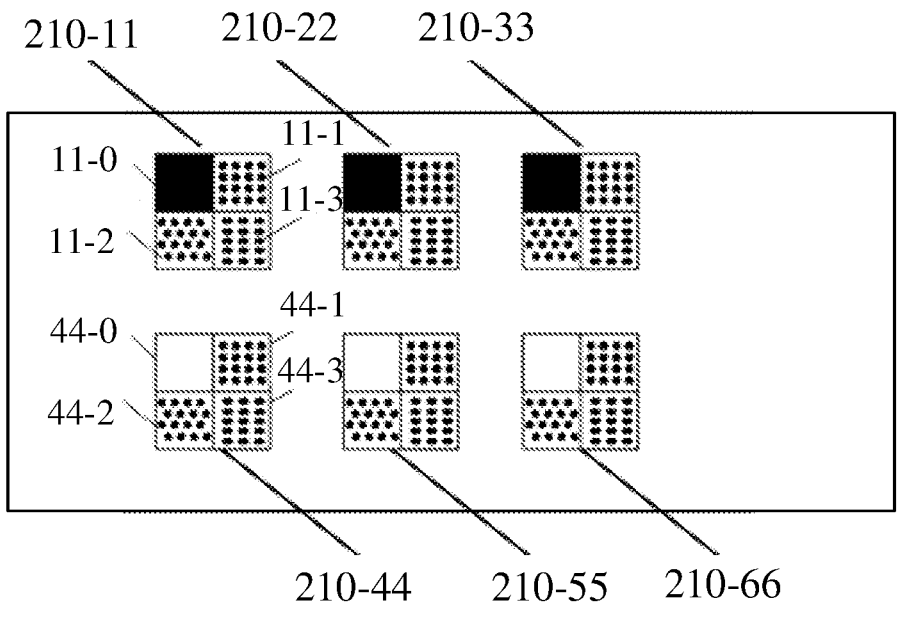
FIG. 15 is a second of structural schematic diagrams of the modulation layer of the spectral chip provided by the embodiment of the present disclosure.
Figure 16:
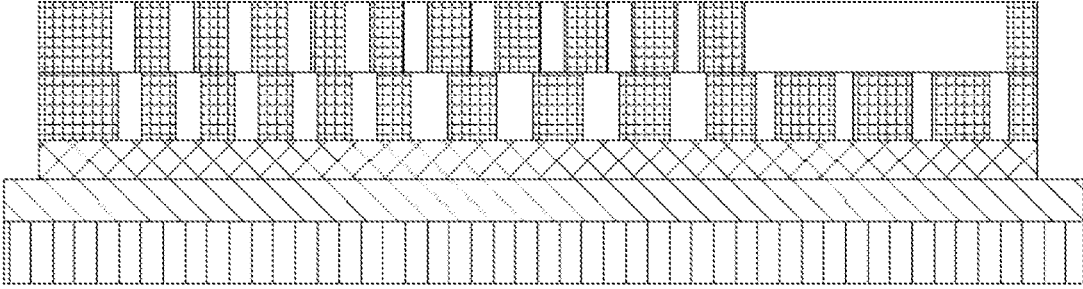
FIG. 16 is a third of structural schematic diagrams of the spectral chip provided by the embodiment of the present disclosure.

In an embodiment, at least one unit area of a layer can be designed as completely engraved or not engraved at all. FIG. 15 is a second of structural schematic diagrams of the modulation layer of the spectral chip provided by the embodiment of the present disclosure, and FIG. 16 is a third of structural schematic diagrams of the spectral chip provided by the embodiment of the present disclosure. As shown in FIG. 15 and FIG. 16, the modulation layer includes a plurality of structural units: structural unit 210-11, structural unit 210-22, structural unit 210-33, structural unit 210-44, structural unit 210-55 and structural unit 210-66. The structural unit 210-11 includes micro-nano structure array 11-0, micro-nano structure array 11-1, micro-nano structure array 11-2 and micro-nano structure array 11-3. The structural unit 210-44 includes micro-nano structure array 44-0, micro-nano structure array 44-1, micro-nano structure array 44-2, and micro-nano structure array 44-3. The micro-nano structure array 11-0 represents that it has been completely engraved. The micro-nano structure array 44-0 represents that it is not engraved at all. In FIG. 16, the left side of the modulation layer on the first layer can represent that it has been completely engraved, and the blank space on the right side of the modulation layer on the first layer can represent that it is not engraved at all.

Figure 17:
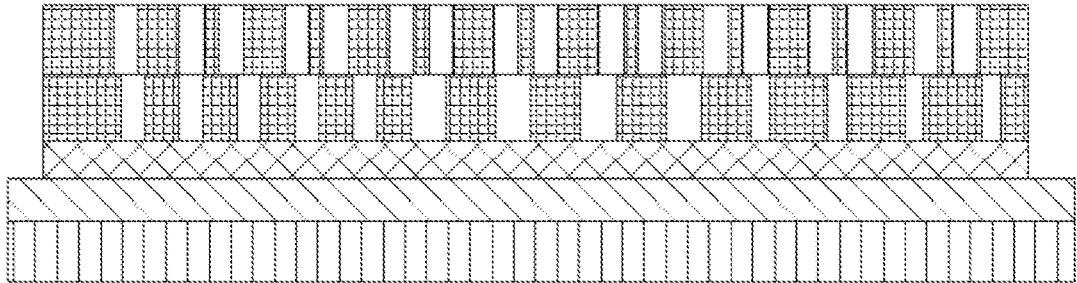
FIG. 17 is a fourth of structural schematic diagrams of the spectral chip provided by the embodiment of the present disclosure.

FIG. 17 is a fourth of structural schematic diagrams of the spectral chip provided by the embodiment of the present disclosure. As shown in FIG. 17, the structural units of different layers may not correspond to each other one-to-one completely, and even some layers may only have one periodic structure.

Figure 18:
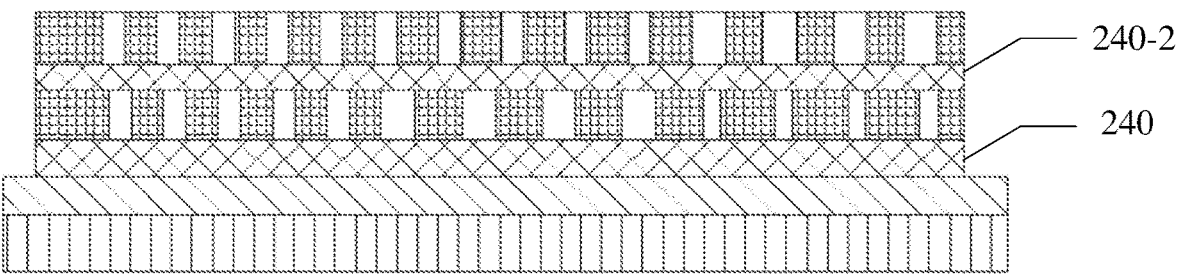
FIG. 18 is a fifth of structural schematic diagrams of the spectral chip provided by the embodiment of the present disclosure.

FIG. 18 is a fifth of structural schematic diagrams of the spectral chip provided by the embodiment of the present disclosure. As shown in FIG. 18, between the sub-layers of the modulation layer, a layer like the aforementioned light-transmitting transition layer 240 can be added to facilitate processing or increase filtering characteristics. In an embodiment, the refractive index of the light-transmitting transition layer 240 is relatively low. In a further embodiment, the light-transmitting transition layer 240 and a connection layer 240-2 can also be regarded as modulation layers, that is, the multi-layer of modulation layer work together to improve the overall complexity, so that the corresponding structural transmission spectra of the modulation layer conforms to the application-specific spectral library. In an embodiment of the present disclosure, the multi-layer can be two layers or more layers, and its essence is to obtain a structural transmission spectra closer to requirements.

Figure 19:
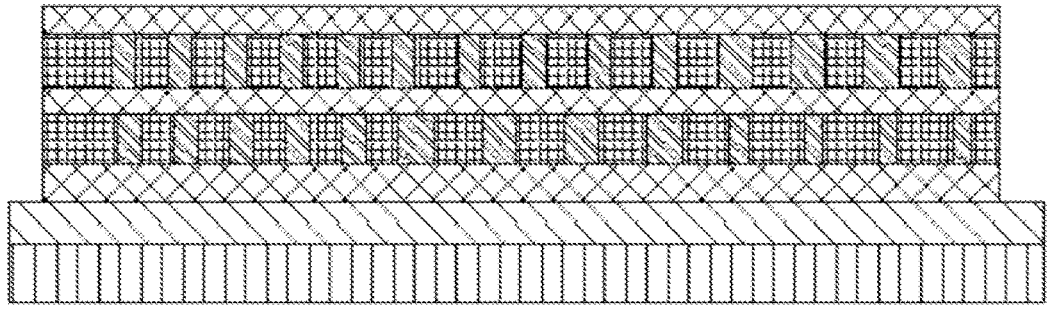
FIG. 19 is a sixth of structural schematic diagrams of the spectral chip provided by the embodiment of the present disclosure.

FIG. 19 is a sixth of structural schematic diagrams of the spectral chip provided by the embodiment of the present disclosure. As shown in FIG. 19, in an embodiment, the first modulation layer and the second modulation layer can have the same shape, but at least one of them is filled with fillers, so it can be considered that the corresponding areas of the first modulation layer and the second modulation layer are different. If both layers have fillers, the properties of the fillers in the two layers can be different to meet the requirements. In an embodiment, the first modulation layer and the second modulation layer can be same but have some deviations in position, such as offset, rotation, deflection, and the like. In an embodiment, a protective layer can be provided, and the protective layer can be provided above the first modulation layer.

It should be noted that the materials of respective modulation layers can be the same or different.

In the spectral chip structure provided by the embodiments of the present disclosure, a modulation layer composed of multiple layer structures can be achieved on an independent chip through a multi-layer stacking design, thereby enriching the types of transmission spectra for structural design.

The spectral chip structure design device for application-specific spectral library provided by the present disclosure will be described below. The spectral chip structure design device for application-specific spectral library described below and the spectral chip structure design method for application-specific spectral library described above can be refer to each other.

Figure 20:
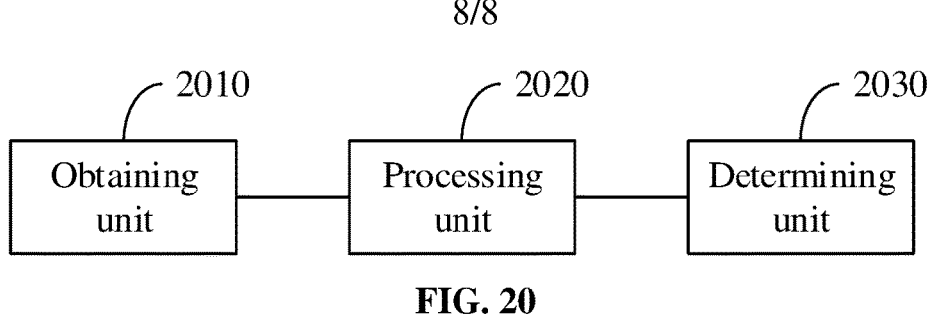
FIG. 20 is a schematic structural diagram of a spectral chip structure design device for application-specific spectral library provided by an embodiment of the present disclosure.

FIG. 20 is a schematic structural diagram of a spectral chip structure design device for application-specific spectral library provided by an embodiment of the present disclosure. As shown in FIG. 20, the spectral chip structure design device for application-specific spectral library provided by the embodiment of the present disclosure includes:

an obtaining unit 2010, configured to obtain an application-specific spectral library and determine a spectral principal component based on the application-specific spectral library;

a processing unit 2020, configured to perform non-negative processing on the spectral principal component to obtain a non-negative spectral principal component; and a determining unit 2030, configured to determine transmission spectra of the spectral chip structure based on the non-negative spectral principal component.

In an embodiment, the obtaining unit 2010 being configured to determine the spectral principal component based on the application-specific spectral library includes:

the obtaining unit 2010 being configured to perform zero-mean processing on the application-specific spectral library to obtain a preprocessed spectral library;

the obtaining unit 2010 being configured to perform principal component analysis on the preprocessed spectral library to obtain at least one initial eigenvector and eigenvalue corresponding to each of the at least one initial eigenvector; and the obtaining unit 2010 being configured to determine a principal component eigenvector based on the eigenvalue, where the principal component eigenvector is used to represent the spectral principal component.

In an embodiment, the obtaining unit 2010 being configured to perform principal component analysis on the preprocessed spectral library to obtain at least one initial eigenvector includes:

the obtaining unit 2010 being configured to perform the principal component analysis on the preprocessed spectral library to obtain at least one initial eigenvector based on preset principal component analysis conditions, where the preset principal component analysis conditions are as follows:

$$\max_{A} \ tr\!\left(A^{T}\tilde{X}\tilde{X}^{T}A\right);$$

$$A^{T}A = I;$$

the obtaining of at least one initial eigenvector includes:
obtaining $A=(a_1, a_2, \ldots, a_n)$,
where tr represents a sum of all elements on a main diagonal, $\tilde{X}$ represents the preprocessed spectral library, $\tilde{X}^{T}$ represents a transpose of $\tilde{X}$, A represents an eigenmatrix, $A^{T}$ represents a transpose of the eigenmatrix, I represents a unitary matrix, and $a_n$ represents the initial eigenvector.

In an embodiment, the obtaining unit 2010 being configured to determine the principal component eigenvector based on the eigenvalue includes:

the obtaining unit 2010 being configured to obtain a corresponding contribution rate of each of the at least one initial eigenvector, where the corresponding contribution rate is a ratio of a corresponding eigenvalue of the initial eigenvector to a sum of all eigenvalues of the at least one initial eigenvector; and the obtaining unit 2010 being configured to determine the initial eigenvector that satisfies a preset contribution rate threshold to be the principal component eigenvector.

In an embodiment, the obtaining unit 2010 is further configured to optimize the contribution rate threshold based on a preset accuracy requirement of spectral measurement and reconstruction.

In an embodiment, the obtaining unit 2010 being configured to determine the principal component eigenvector based on the eigenvalue includes:

the obtaining unit 2010 being configured to sequence the eigenvalue in descending order, and determine the initial eigenvectors corresponding to the first K eigenvalues as principal component eigenvectors, where K is a preset positive integer.

In an embodiment, the obtaining unit 2010 is further configured to optimize the preset K based on a preset accuracy requirement of spectral measurement and reconstruction.

In an embodiment, the spectral chip includes at least one structural unit, the device further includes a weighting unit, and the weighting unit is configured to perform quantity weighting based on the eigenvalue, and determine the quantity of a corresponding structural unit of each principal component eigenvector.

In an embodiment, the processing unit 2020 being configured to perform non-negative processing on the spectral principal component to obtain the non-negative spectral principal component includes:

the processing unit 2020 being configured to obtain an absolute value of the spectral principal component to obtain the non-negative spectral principal component; or the processing unit 2020 being configured to add a preset complementary value to the spectral principal component to obtain the non-negative spectral principal component.

In an embodiment, the device further includes an evaluating unit, and the evaluating unit is configured to perform similarity evaluation on the non-negative spectral principal component and the transmission spectra of the spectral chip structure, and optimize the transmission spectra of the spectral chip structure based on a similarity evaluation result.

In an embodiment, the method for evaluating the similarity includes any of the following: likelihood calculation, correlation calculation, point-by-point difference, and root mean square error calculation.

In an embodiment, the device further includes an updating unit, and the updating unit is configured to update the application-specific spectral library.

It should be noted here that the above-mentioned device provided by the embodiments of the present disclosure can realize all the method steps realized by the above-mentioned method embodiments, and can achieve the same effect. The same portion and beneficial effects of the device embodiments and the method embodiments will not be described herein in detail.

Figure 21:
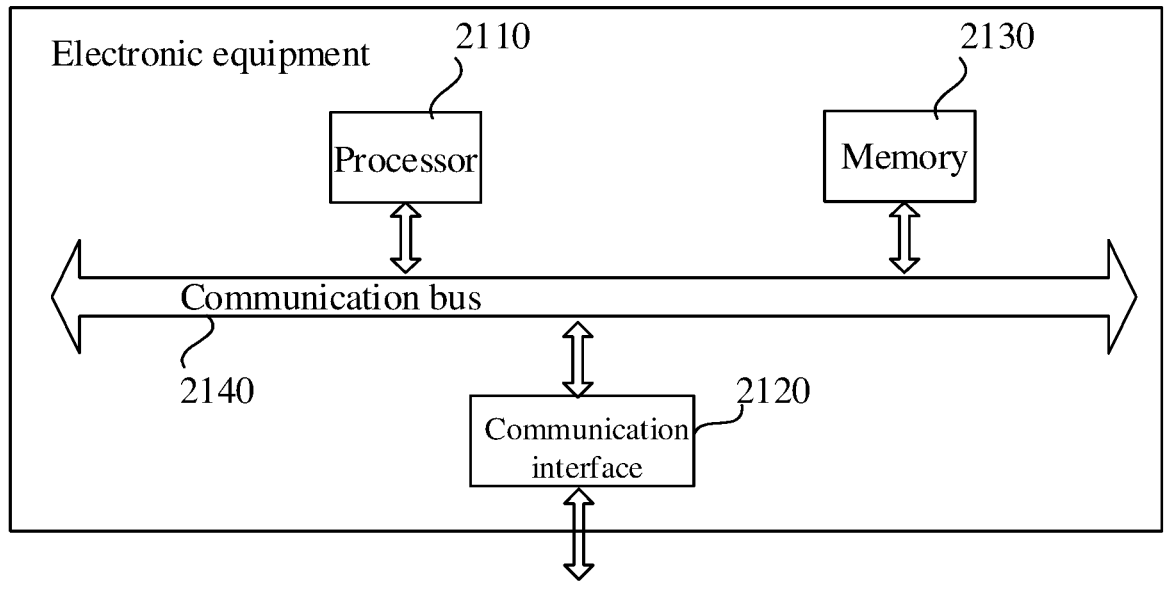
FIG. 21 is a schematic structural diagram of an electronic equipment provided by an embodiment of the present disclosure.

FIG. 21 is a schematic structural diagram of an electronic equipment provided by an embodiment of the present disclosure. As shown in FIG. 21, the electronic equipment can include: a processor 2110, a communication interface 2120, a memory 2130, and a communication bus 2140. The processor 2110, the communication interface 2120, and the memory 2130 communicate with each other through the communication bus 2140. The processor 2110 can call the logic instructions in the memory 2130 to execute a spectral chip structure design method for application-specific spectral library. The method includes: obtaining an application-specific spectral library, and determining a spectral principal component based on the application-specific spectral library; performing non-negative processing on the spectral principal component to obtain a non-negative spectral principal component; and determining transmission spectra of the spectral chip structure based on the non-negative spectral principal component.

In addition, the above-mentioned logic instructions in the memory 2130 can be implemented in the form of software functional units and can be stored in a computer-readable storage medium when sold or used as an independent product. Based on this understanding, the solutions of the present disclosure or the part that contributes to the related art or the part of the solutions can be embodied in the form of a software product in essence. The computer software product is stored in a storage medium, including several instructions used to cause a computer device (such as a personal computer, a server, or a network device, etc.) to execute all or part of the steps of the methods described in the various embodiments of the present disclosure. The aforementioned storage medium includes: USB flash memory, mobile hard disk, Read-Only Memory (ROM), Random Access Memory (RAM), magnetic disk or optical disk and other media that can store program codes.

The present disclosure further provides a computer program product, and the computer program product includes a computer program. The computer program can be stored in a non-transitory computer-readable storage medium, and when the computer program is executed by a processor, the computer can execute the spectral chip structure design method for application-specific spectral library provided by the above method embodiments. The method includes: obtaining an application-specific spectral library, and determining a spectral principal component based on the application-specific spectral library; performing non-negative processing on the spectral principal component to obtain a non-negative spectral principal component; and determining transmission spectra of the spectral chip structure based on the non-negative spectral principal component.

The present disclosure further provides a non-transitory computer-readable storage medium having a computer program stored thereon, where the computer program, when executed by a processor, causes the processor to perform the spectral chip structure design method for application-specific spectral library provided by the above method embodiments. The method includes: obtaining an application-specific spectral library, and determining a spectral principal component based on the application-specific spectral library; performing non-negative processing on the spectral principal component to obtain a non-negative spectral principal component; and determining transmission spectra of the spectral chip structure based on the non-negative spectral principal component.

The device embodiments described above are only illustrative, in which the unit described as a separate component may be or may not be physically separated, and the component displayed as a unit may be or may not be a physical unit. That is, it may be located in one position or may be distributed to multiple network units. Some or all of the modules may be selected according to the actual needs to achieve the purpose of the solutions in these embodiments. Those of ordinary skill in the art may understand and implement these embodiments without creative effort.

From the description of the above embodiments, those skilled in the art can clearly understand that each embodiment can be implemented by means of software plus a necessary general hardware platform, and certainly can also be implemented by hardware. Based on this understanding, the above solutions or the part of the solutions that contributes to the related art can be embodied in the form of a software product, and the computer software products can be stored in computer-readable storage media, such as ROM/RAM, magnetic disk, optical disk or the like, including several instructions for causing a computer device (which can be a personal computer, a server, or a network equipment or the like) to perform the methods described in various embodiments or some parts of the embodiments.

Finally, it should be noted that the above embodiments are only used to illustrate the solutions of the present application, but not to limit them; although the present application has been described in detail with reference to the foregoing embodiments, those of ordinary skill in the art should understand that: they can still modify the solutions described in the foregoing embodiments, or equivalently replace some features thereof; while these modifications or replacements do not make the essence of the corresponding solutions deviate from the scope of the solutions in the embodiments of the present application.

What is claimed is:

1. A spectral chip structure design method, comprising:
determining spectral principal components based on an application-specific spectral library;
performing non-negative processing on the spectral principal components to obtain non-negative spectral principal components; and
determining transmission spectra of a spectral chip structure based on the non-negative spectral principal components;
the determining the spectral principal components based on the application-specific spectral library comprises:
performing zero-mean processing on the application-specific spectral library to obtain a preprocessed spectral library;
performing principal component analysis on the preprocessed spectral library to obtain several initial eigenvectors and eigenvalues corresponding to respective initial eigenvectors; and
determining principal component eigenvectors based on the eigenvalues, wherein the principal component eigenvectors are used to represent the spectral principal components.

2. The method of claim 1, wherein the performing principal component analysis on the preprocessed spectral library to obtain the several initial eigenvectors comprises:
performing principal component analysis on the preprocessed spectral library based on preset principal component analysis conditions to obtain the several initial eigenvectors,
wherein the preset principal component analysis conditions are as follows:

$$\max_{A} tr\left(A^T \tilde{X} \tilde{X}^T A\right);$$

$$A^T A = I;$$

obtaining A=(a$_1$, a$_2$, . . . , a$_n$),
wherein tr represents a sum of all elements on a main diagonal, $\tilde{X}$ represents the preprocessed spectral library, $\tilde{X}^T$ represents a transpose of $\tilde{X}$, A represents an eigenmatrix, $A^T$ represents a transpose of the eigenmatrix, I represents a unitary matrix, and an represents an initial eigenvector.

3. The method of claim 1, wherein the determining the principal component eigenvectors based on the eigenvalues comprises:

obtaining a corresponding contribution rate of each of the initial eigenvectors, wherein the corresponding contribution rate is a ratio of a corresponding eigenvalue of the initial eigenvector to a sum of eigenvalues of all the initial eigenvectors; and determining initial eigenvectors that satisfy a preset contribution rate threshold to be the principal component eigenvectors.

4. The method of claim 2, further comprising:

optimizing the contribution rate threshold based on a preset accuracy requirement of spectral measurement and reconstruction.

5. The method of claim 3, wherein the spectral chip structure comprises at least one structural unit, and the method further comprises:

performing quantity weighting based on the eigenvalues, and determining the quantity of a corresponding structural unit of each principal component eigenvector.

6. The method of claim 5, wherein the spectral principal component with a larger contribution rate corresponds to a larger quantity of structural units.

7. The method of claim 3, wherein the determining the initial eigenvectors that satisfy the preset contribution rate threshold to be the principal component eigenvectors comprises:

when the corresponding contribution rate of the initial eigenvector satisfies the preset contribution rate threshold, determining the initial eigenvector as the principal component eigenvector; and when a sum of the corresponding contribution rates of two or more initial eigenvectors satisfies the preset contribution rate threshold, determining the two or more initial eigenvectors as the principal component eigenvectors.

8. The method of claim 1, wherein the determining the principal component eigenvectors based on the eigenvalues comprises:

sequencing the eigenvalues in descending order, and determining initial eigenvectors corresponding to first K eigenvalues to be the principal component eigenvectors, wherein K is a preset positive integer.

9. The method of claim 8, further comprising:

optimizing the preset K based on a preset accuracy requirement of spectral measurement and reconstruction.

10. The method of claim 1, wherein the performing non-negative processing on the spectral principal components to obtain the non-negative spectral principal components comprises:

obtaining absolute values of the spectral principal components to obtain the non-negative spectral principal components; or adding a preset complementary value to the spectral principal components to obtain the non-negative spectral principal components.

11. The method of claim 1, wherein the determining the transmission spectra of the spectral chip structure based on the non-negative spectral principal components comprises:

designing the transmission spectra of the spectral chip structure according to the non-negative spectral principal components; or selecting the transmission spectra of the spectral chip structure from pre-obtained candidate transmission spectra according to the non-negative spectral principal components.

12. The method of claim 11, further comprising:

performing similarity evaluation on the non-negative spectral principal components and the transmission spectra of the spectral chip structure, and optimizing the transmission spectra of the spectral chip structure based on a similarity evaluation result.

13. The method of claim 12, wherein a similarity evaluation method comprises any one of the followings: likelihood calculation, correlation calculation, point-by-point difference, and root mean square error calculation.

14. The method of claim 12, wherein the optimizing the transmission spectra of the spectral chip structure based on the similarity evaluation result comprises:

optimizing the transmission spectra of the spectral chip structure by one or more of the followings:

adjusting details of the spectral chip structure based on an inverse design theory;

changing a period of the spectral chip structure;

adjusting a position of absorption peak; and/or adjusting a material of the spectral chip structure to adjust refraction index.

15. The method of claim 1, further comprising:

updating the application-specific spectral library.

16. The method of claim 1, wherein the spectral chip structure comprises a modulation layer and an image sensor, and the modulation layer has micro-nano structure arrays which have different modulation roles on incident light at different wavelength bands.

17. The method of claim 1, wherein the performing zero-mean processing on the application-specific spectral library to obtain the preprocessed spectral library comprises:

obtaining a mean spectrum of all spectrum samples in the application-specific spectral library; and subtracting the mean spectrum from each of the spectrum samples to obtain the preprocessed spectral library.

18. A non-transitory computer-readable storage medium having a computer program stored thereon, wherein the computer program, when executed by a processor, causes the processor to perform the steps of the spectral chip structure design method of claim 1.

19. A spectral chip structure design device, comprising a processor and a memory storing a computer program that is executable by the processor, wherein the computer program, when executed by the processor, causes the processor to:

determine a spectral principal component based on an application-specific spectral library;

perform non-negative processing on the spectral principal component to obtain a non-negative spectral principal component; and determine transmission spectra of the spectral chip structure based on the non-negative spectral principal component;

the computer program, when executed by the processor, further causes the processor to:

perform zero-mean processing on the application-specific spectral library to obtain a preprocessed spectral library;

perform principal component analysis on the preprocessed spectral library to obtain several initial eigenvectors and eigenvalues corresponding to respective initial eigenvectors; and determine principal component eigenvectors based on the eigenvalues, wherein the principal component eigenvectors are used to represent the spectral principal component.

* * * * *